Patented Sept. 21, 1943

2,329,705

UNITED STATES PATENT OFFICE 2,329,705

ORGANIC ESTERS OF CELLULOSE

Camille Dreyfus, New York, N. Y., and Robert D. Rowley, Cumberland, Md., assignors to Celanese Corporation of America, a corporation of Delaware No Drawing. Application July 3, 1942, Serial No. 449,592

7 Claims. (Cl. 260—230)

This invention relates to improvements in the production of organic esters of cellulose, and relates more particularly to the production of cellulose acetate or other cellulose esters, particularly the lower fatty acid esters of cellulose.

An object of our invention is the production of organic acid esters of cellulose of improved stability.

Another object of our invention is the production of organic esters of cellulose which are particularly adapted for use in molding operations.

Other objects of our invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent, or solvent, for the ester of cellulose being formed. The esterified cellulose is obtained in the form of a viscous, homogeneous solution in the organic acid diluent, to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from the solution. The cellulose ester is finally washed with water to free it of acids as much as is possible.

In the preparation of cellulose acetate in accordance with the above process, the cellulose, with or without a pretreatment with organic acids, or organic acids containing some sulfuric acid, is usually acetylated by treatment with acetic anhydride and a catalyst, such as sulfuric acid, in the presence of glacial acetic acid as a solvent for the cellulose acetate formed. The sulfuric acid catalyst is normally present in amounts of from 9 to 15%, or even 20%, on the weight of the cellulose. Part of this sulfuric acid may be introduced in the pretreatment which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid, containing the sulfuric acid employed as the esterification catalyst, is permitted to stand and to ripen until the desired solubility characteristics are reached. During this ripening period, not only are acetyl groups split off, but in addition, combined sulfuric acid is split off. When the desired solubility characteristics are reached, further ripening is halted and the solution is treated with a large excess of water or other non-solvent to precipitate the cellulose acetate. The precipitated cellulose acetate is washed with water to remove as much acid and other non-cellulose ester materials as possible. After washing, the cellulose acetate is subjected to a stabilizing treatment, usually by heating it in suspension in very dilute sulfuric acid, with the object of still further reducing its content of combined sulfuric acid and other sulfur compounds. The latter impair the stability of the cellulose acetate and impart thereto a tendency to decompose, degrade and/or discolor. The degree of stability is measured by the acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the acetylation may take from 1½ to 7 hours and the ripening from 20 to 45 or 50 hours, while the stabilizing treatment may take from 3 to 6 hours to achieve the desired stability in the product. Not only is productive capacity seriously limited by the necessity for prolonged ripening and a stabilization treatment, but the latter consumes substantial amounts of sulfuric acid and adds to the cost of production.

We have now discovered that cellulose acetate, as well as other organic esters of cellulose of excellent stability may be prepared in a relatively short period of time without requiring any stabilizing treatment. These desirable results may be achieved if, after an acetylation reaction, as described, the cellulose acetate so produced is ripened at an elevated temperature in the presence of a substantially reduced amount of catalyst and the ripening carried out in stages, water for ripening being added in each of said stages.

In accordance with the process of our invention, the amount of catalyst present for ripening is reduced by the addition of a suitable neutralizing agent, to an amount of at most 1% on the weight of the cellulose, and preferably to a value of from 0.1 to 1%, water for ripening is added and the ripening is carried out at an elevated temperature. The water for this first ripening stage may be added together with the neutralizing agent and in an amount of from 20 to 60% on the weight of the original cellulose. Ripening is conducted at a temperature of from 60° to 90° C. for 4 to 20 hours, preferably to the point where the cellulose acetate is soluble in hot chloroform. When the ripening has proceeded to this point, further water for ripening is added for the second stage in an amount equal to 40 to 180% on the weight of the original cellulose and ripening is continued at an elevated temperature within the range heretofore indicated, until the desired solubility characteristics are reached, whereupon the cellulose acetate may be precipitated from solution. The cellulose acetate, so produced, is of an unusual degree of stability, is free of color and may be employed in molding operations with only slight viscosity loss.

The water for ripening may be added as such or advantageously may be added in the form of a dilute solution of acetic acid to avoid any substantial precipitation of the cellulose acetate. The neutralizing agent may be added together with the water for ripening, particularly if the latter is added in the form of a dilute solution of acetic acid, in solution in glacial acetic acid, or it may be added separately in powder form.

The neutralizing agent employed may be a salt of magnesium or calcium, such as for example, magnesium acetate, calcium acetate, magnesium carbonate, or calcium carbonate. Zinc acetate, zinc oxide or the oxides, carbonates or hydroxides of aluminum barium, copper, lithium and strontium, as well as organic acid salts of these metals may also be employed as the neutralizing agent. Mixtures of any two or more of the foregoing compounds may be used. The neutralizing agent preferably employed in accordance with this invention comprises a mixture of magnesium acetate and calcium acetate.

Prior to acetylation the cellulose may, for example, be pretreated with acetic acid or formic acid, or a mixture of these acids in order to render it more reactive. The acids may be present in a small amount, say, for example, from 1 to 50% on the weight of the cellulose, or in much larger quantities, for example, on the order of 100%, 200% or even 300% on the weight of the cellulose, and may contain a small quantity of sulfuric acid, for instance, ½ to 1 or 2% on the weight of the cellulose. The pretreatment is preferably allowed to go on for some hours, for example overnight, though much shorter periods produce the desired results when sulfuric acid is present. The pretreated cellulose is then treated with acetic anhydride and sulfuric acid in appropriate amount to bring about acetylation.

The cellulose materials esterified in accordance with our process may be any suitable form of cellulose or cellulose derivative. It may be cotton, cotton linters, wood pulp, regenerated cellulose, or other cellulosic material obtainable from various other sources such as grasses, straws, hulls and the like.

In order further to illustrate our invention, but without being limited thereto, the following examples are given:

Example I 170 parts by weight of cotton are acetylated with 400 parts of acetic anhydride, 1000 parts of acetic acid and 17 parts of sulfuric acid. The time of acetylation is 5 hours during which time the mixture is allowed to reach a peak temperature of 32° C. After the acetylation is completed, water in an amount sufficient only to react with any excess acetic anhydride is added to the reaction mixture.

There is then added to the acetylation mixture sufficient neutralizing agent to neutralize 90% of the sulfuric acid present, leaving but 1% on the weight of the original cotton. Water is added with the neutralizing agent in an amount equal to 40% on the weight of the original cotton. The neutralizing agent employed comprises a mixture of magnesium acetate and calcium acetate obtained by reacting calcined dolomite in dilute acetic acid to form said acetates, the resulting clear aqueous solution being employed as the neutralizing agent.

The solution is heated to 75° C. with steam, and ripening is conducted until a sample of precipitated cellulose acetate is soluble in hot chloroform. This stage is reached in 6 hours. A second addition of water is made at this point in an amount equal to 110% on the weight of the original cotton, making a total water addition of 150% in all. Ripening is continued at 75° C. for 4 hours, at which time the cellulose acetate reaches an acetyl value of 55%, calculated as acetic acid. The cellulose acetate is precipitated from solution by the addition of a large amount of water, and is washed and dried. The cellulose acetate obtained is of a high degree of stability and requires no stabilizing treatment to be employed for any purpose. The cellulose acetate is particularly suitable for molding purposes.

Example II

Cotton is acetylated in the manner described in Example I. After acetylation is completed and the excess acetic anhydride destroyed, sufficient neutralizing agent, prepared as described, is added to the solution of cellulose acetate to neutralize 95% of the sulfuric acid present, leaving but ½% on the weight of the original cotton for ripening. Water in an amount equal to 42.2% on the weight of the cotton is added with the neutralizing agent. The solution is heated to 80° C. and permitted to ripen at this temperature for 7½ hours at which point a sample of precipitated cellulose acetate is soluble in hot chloroform. A second addition of water is made at this point to bring the total water added to the ripening solution to 150% on the weight of the original cotton. Ripening is continued at 80° C. for 9 hours longer at which time the cellulose acetate has an acetyl value of 53.3%. The cellulose acetate is precipitated from solution by the addition of a large amount of water. The cellulose acetate requires no stabilization and is especially suitable for molding purposes, exhibiting a very low viscosity loss after being molded.

While our invention is particularly described in connection with the acetylation of cellulose employing sulfuric acid as catalyst, other catalysts may be used as well, such as, for example, phosphoric acid, or mixtures of phosphoric acid and sulfuric acid. Preferably, we employ sulfuric acid alone without any other mineral acid present during either acetylation or ripening. In a similar way, employing the proper esterifying agent or agents, other cellulose esters may be prepared, for example, the cellulose esters of propionic, butyric or similar acids, or mixed ester, for example, cellulose acetate-propionate or cellulose acetate-butyrate.

It is to be understood that the foregoing detailed description is merely given by way of illustration and that many variations may be made therein without departing from the spirit of our invention.

Having described our invention, what we desire to secure by Letters Patent is:

1. Process for the production of organic acid esters of cellulose of improved characteristics, which comprises esterifying cellulose by means of a lower fatty acid anhydride in the presence of an inorganic acid catalyst selected from the group consisting of sulfuric acid and phosphoric acid, adding a neutralizing agent selected from the group consisting of magnesium, calcium, zinc and aluminum compounds to reduce the amount of catalyst present in the esterification mixture to from 0.1 to 1%, based on the weight of the cellulose originally present, of free acid, and ripening the lower fatty acid ester of cellulose produced to the desired solubility characteristics in a plurality of stages, water being added during each stage of ripening.

2. Process for the production of cellulose acetate of improved characteristics, which comprises acetylating cellulose by means of acetic anhydride in the presence of acetic acid as solvent and sulfuric acid as catalyst, adding a neutralizing agent selected from the group consisting of magnesium, calcium, zinc and aluminum compounds to reduce the amount of sulfuric acid present in the acetylation mixture to from 0.1 to 1%, based on the weight of the cellulose originally present, of free acid, and ripening the cellulose acetate produced to the desired solubility characteristics in a plurality of stages, water being added during each stage of ripening.

3. Process for the production of organic acid esters of cellulose of improved characteristics, which comprises esterifying cellulose by means of a lower fatty acid anhydride in the presence of an inorganic acid catalyst selected from the group consisting of sulfuric acid and phosphoric acid, adding a neutralizing agent selected from the group consisting of magnesium, calcium, zinc and aluminum compounds to reduce the amount of catalyst present in the esterification mixture to from 0.1 to 1%, based on the weight of the cellulose originally present, of free acid, and ripening the lower fatty acid ester of cellulose produced to the desired solubility characteristics in a plurality of stages at a temperature of 60 to 90° C., water being added during each stage of ripening.

4. Process for the production of cellulose acetate of improved characteristics, which comprises acetylating cellulose by means of acetic anhydride in the presence of acetic acid as solvent and sulfuric acid as catalyst, adding a neutralizing agent selected from the group consisting of magnesium, calcium, zinc and aluminum compounds to reduce the amount of sulfuric acid present in the acetylation mixture to from 0.1 to 1%, based on the weight of the cellulose originally present, of free acid, and ripening the cellulose acetate produced to the desired solubility characteristics in a plurality of stages at a temperature of 60 to 90° C., water being added during each stage of ripening.

5. Process for the production of organic acid esters of cellulose of improved characteristics, which comprises esterifying cellulose by means of a lower fatty acid anhydride in the presence of an inorganic acid catalyst selected from the group consisting of sulfuric acid and phosphoric acid, adding a neutralizing agent selected from the group consisting of magnesium, calcium, zinc and aluminum compounds to reduce the amount of catalyst present in the esterification mixture to from 0.1 to 1%, based on the weight of the cellulose originally present, of free acid, adding water, allowing the lower fatty acid ester of cellulose produced to ripen at a temperature of at least 60° C., again adding water and allowing the lower fatty acid ester of cellulose to ripen to the desired solubility characteristics at a temperature of at least 60° C.

6. Process for the production of cellulose acetate of improved characteristics, which comprises acetylating cellulose by means of acetic anhydride in the presence of acetic acid as solvent and sulfuric acid as catalyst, adding a neutralizing agent selected from the group consisting of magnesium, calcium, zinc and aluminum compounds to reduce the amount of sulfuric acid present in the acetylation mixture to from 0.1 to 1%, based on the weight of the cellulose originally present, of free acid, adding water, allowing the cellulose acetate produced to ripen at a temperature of at least 60° C., again adding water and allowing the cellulose acetate to ripen to the desired solubility characteristics at a temperature of at least 60° C.

7. Process for the production of cellulose acetate of improved characteristics, which comprises acetylating cellulose by means of acetic anhydride in the presence of acetic acid as solvent and sulfuric acid as catalyst, adding a neutralizing agent selected from the group consisting of magnesium, calcium, zinc and aluminum compounds to reduce the amount of sulfuric acid present in the acetylation mixture to from 0.1 to 1%, based on the weight of the cellulose originally present, of free acid, adding water in an amount equal to 20 to 60% on the weight of the cellulose originally present, allowing the cellulose acetate produced to ripen at a temperature of at least 60° C., adding additional water in an amount equal to 40 to 180% and allowing the cellulose acetate to ripen to the desired solubility characteristics at a temperature of at least 60° C.

CAMILLE DREYFUS.
ROBERT D. ROWLEY.